United States Patent
Speker et al.

(10) Patent No.: US 12,017,303 B2
(45) Date of Patent: Jun. 25, 2024

(54) LASER CUTTING NOZZLE FOR A LASER MACHINING UNIT AND METHOD FOR OPERATING SUCH A LASER MACHINING UNIT

(71) Applicant: TRUMPF Laser- und Systemtechnik GmbH, Ditzingen (DE)

(72) Inventors: Nicolai Speker, Pleidelsheim (DE); Johannes Seebach, Stuttgart (DE); Olga Kramlich, Pforzheim (DE); Artur Schellenberg, Neuenburg am Rhein (DE)

(73) Assignee: TRUMPF Laser—und Systemtechnik GmbH, Ditzingen (DE)

( * ) Notice: Subject to any disclaimer, the term of this patent is extended or adjusted under 35 U.S.C. 154(b) by 60 days.

(21) Appl. No.: 17/945,501

(22) Filed: Sep. 15, 2022

(65) Prior Publication Data
US 2023/0021130 A1 Jan. 19, 2023

Related U.S. Application Data

(63) Continuation of application No. 16/367,325, filed on Mar. 28, 2019, now Pat. No. 11,458,574, which is a
(Continued)

(51) Int. Cl.
*B23K 26/38* (2014.01)
*B23K 26/03* (2006.01)
*B23K 26/14* (2014.01)

(52) U.S. Cl.
CPC ............ *B23K 26/38* (2013.01); *B23K 26/03* (2013.01); *B23K 26/0342* (2015.10); *B23K 26/1462* (2015.10); *B23K 26/1476* (2013.01)

(58) Field of Classification Search
CPC ............... B23K 26/03; B23K 26/0342; B23K 26/1462; B23K 26/1476; B23K 26/38; B23K 26/14
See application file for complete search history.

(56) References Cited

U.S. PATENT DOCUMENTS

| | | | |
|---|---|---|---|
| 4,031,351 A | 6/1977 | Martin | |
| 4,913,405 A * | 4/1990 | Van Der Have | ... B23K 26/0665 219/121.67 |

(Continued)

FOREIGN PATENT DOCUMENTS

| | | |
|---|---|---|
| BE | 805989 A1 | 4/1974 |
| CN | 101104222 A | 1/2008 |

(Continued)

OTHER PUBLICATIONS

CN Office Action in Chinese Appln. No. 201680089495.7, dated Jul. 3, 2020, 18 pages (with English translation).
(Continued)

*Primary Examiner* — Dana Ross
*Assistant Examiner* — Adam M Eckardt
(74) *Attorney, Agent, or Firm* — Fish & Richardson P.C.

(57) ABSTRACT

A laser cutting nozzle for a laser machining unit is described, the nozzle including a passage for the laser beam and cutting gas. The passage extends between a nozzle inlet and a nozzle mouth along a passage longitudinal axis. The passage comprises a convergence portion and a divergence portion. In the entire divergence portion, the wall of the passage forms an angle of inclination relative to the passage longitudinal axis of at most 5°. In addition, the length of the divergence portion is less than 5 times the diameter of the constriction.

21 Claims, 3 Drawing Sheets

Related U.S. Application Data continuation of application No. PCT/EP2016/074549, filed on Oct. 13, 2016.

(56) References Cited

U.S. PATENT DOCUMENTS

| | | | |
|---|---|---|---|
| 6,003,789 | A | 12/1999 | Base et al. |
| 6,423,928 | B1 * | 7/2002 | Piwczyk ............... B23K 26/04 |
| | | | 219/121.67 |
| 11,458,574 | B2 | 10/2022 | Speker et al. |
| 2019/0217421 | A1 | 7/2019 | Speker et al. |

FOREIGN PATENT DOCUMENTS

| | | | | |
|---|---|---|---|---|
| CN | 103071934 | A | | 5/2013 |
| CN | 204234971 | | | 4/2015 |
| CN | 204234971 | U | * | 4/2015 |
| FR | 3012353 | A1 | * | 5/2015 ............ B23K 26/14 |
| GB | 1437237 | A | | 5/1976 |

OTHER PUBLICATIONS

CN Search Report in Chinese Appln. No. 201680089495.7, dated Jun. 28, 2020, 2 pages.

PCT International Search Report and Written Opinion for International Application No. PCT/EP2016/074549 dated Jul. 6, 2017.

Man et al., "Design and Characteristic Analysis of Supersonic Nozzles for High Gas Pressure Laser Cutting", *Journal of Materials Processing Technology*, vol. 63, pp. 217-222 (1997).

* cited by examiner

LASER CUTTING NOZZLE FOR A LASER MACHINING UNIT AND METHOD FOR OPERATING SUCH A LASER MACHINING UNIT

CROSS REFERENCE TO RELATED APPLICATIONS

This application is a continuation of and claims priority under 35 U.S.C. § 120 from U.S. application Ser. No. 16/367,325, filed on Mar. 28, 2019, which is a continuation of PCT Application No. PCT/EP2016/074549. filed on Oct. 13, 2016. The entire contents of each of these priority application are incorporated herein by reference.

TECHNICAL FIELD

The invention relates to a laser cutting nozzle for a laser machining unit.

BACKGROUND

Modern laser machining units are generally able to deliver flawless cutting results at high machining speeds. Said units encounter limitations, however, when machining complex three-dimensional workpieces. For example, parameters that determine the cutting process, such as the nozzle-workpiece distance, the position of the laser nozzle, etc., may not be able to be kept sufficiently constant or set sufficiently precisely owing to unfavorable spatial configurations. Quality losses may thus occur in the case of cutting work in corners or at angles of a workpiece, leading for example to increased occurrence of corrugations or (micro) ridges. Furthermore, the risk of component collisions, e.g. owing to workpieces that deviate from the specified shape, increases with increasing the machining speed and a small nozzle distance from the workpiece.

It is known from literature that the characteristics of the cutting gas jet emerging from the nozzle have a significant influence on the quality of the cutting results. For this reason, for shaping the gas jet, nozzles having an inner contour or passage were proposed which, in a manner deviating from nozzles having a simple conical passage, are provided with a conical-cylindrical, conical-divergent or generally with a convergent-divergent passage. By way of example, reference is made to the technical article "Design and Characteristic Analysis of Supersonic Nozzles for High Gas Pressure Laser Cutting" by H. C. Man et al., Journal of Materials Processing Technology, Volume 63 (1997), pages 217-222.

A laser cutting nozzle of the type mentioned at the outset, comprising a convergent-divergent passage, is known for example from U.S. Pat. No. 6,423,928. Proceeding from a cylindrical constriction portion, the known nozzle has a marked conical cross-sectional widening in the mouth region. As a result thereof, the nozzle furthermore comprises just a very narrow end face at the end facing the workpiece, and the sensitivity of the nozzle to capacitive distance control is therefore suitable only for very small machining distances.

SUMMARY

This document describes a laser machining unit including a passage for the laser beam and cutting gas, which passage extends between a nozzle inlet and a nozzle mouth, along a passage longitudinal axis, the passage converging continuously, towards the mouth thereof, in a convergence portion, as far as a constriction of the passage, to less than 40% of the cross-sectional area at the inlet of the convergence portion, the passage diverging continuously in a divergence portion, proceeding from the constriction, as far as the mouth of the passage, to over 130% of the cross-sectional area at the constriction.

The invention further relates to a laser machining unit comprising a laser cutting nozzle of this kind, and to a method for operating the laser machining unit.

The object of the invention is that of providing a laser cutting nozzle that allows for three-dimensional laser cutting machining having better cutting results.

Within the meaning of the invention, the wall of the convergent-divergent passage is at an angle of inclination relative to the passage longitudinal axis of at most 5°, over the entire divergence portion, and the length of the divergence portion is less than 5 times the diameter of the constriction.

The average angle of inclination of the wall of the passage relative to the passage longitudinal axis in the divergence portion is preferably less than 4.0°. In particularly preferred designs of the nozzle, the angle of inclination is even less than 3.0° or less than 2.0°. In particular, however, the average angle of inclination is greater than 1.0°.

Limiting the angle of inclination to at most 5° in the divergence portion ensures effective shaping of the emerging gas jet over the entire divergence portion. "Detachment" or "break-off" of the gas flow at the edges, which results in undesired inhomogeneity of the gas flow, is prevented. Despite the relatively small maximum angle of inclination, the divergence portion can be, however, not longer than 5 times the diameter of the constriction. It has surprisingly been found that this length is sufficient for effective gas jet shaping. In particular, even a length of the divergence portion of less than 4 times or 3 times the diameter of the constriction is sufficient. However, in order to ensure a sufficient effect, the difference portion should preferably be at least more than twice the diameter of the constriction.

The shaping, according to the invention, of the passage brings about constant fluid dynamic ratios in the gas stream over a large distance, in particular over a region of from 1.5 to 6 mm, after said stream leaves the nozzle, i.e. in particular during machining on the workpiece surface and in the cutting gap. In this case, the shaping according to the invention causes the cutting gas to at least reach the speed of sound and for this to be retained over a long effective distance. The nozzle is in particular shaped such that the cutting gas already reaches the speed of sound at the constriction, and is subsequently accelerated to supersonic speed in the divergent part of the nozzle.

In the case of a preferred embodiment of the invention, the average angle of inclination of the wall in the convergence portion is greater than 5°. Owing to the greater angle of inclination, the convergence portion can be designed so as to be shorter, with the result that the nozzle as a whole is more compact. In particular, the length of the divergence portion is advantageously more than 1.4 times and/or less than 1.7 times the length of the convergence portion.

The average angle of inclination of the wall in the convergence portion is preferably even greater than 7°. However, in order to prevent undesired influences on the gas flow, the average angle of inclination is in particular less than 15°, preferably even less than 13°.

In a preferred variant of the invention, the convergence portion transitions directly into the divergence portion at the constriction. The fact that the convergence and divergence portion are in direct succession makes the desired effect of the increase in the flow speed (preferably to supersonic speed) particularly pronounced. In particular, no cylindrical constriction portion of significant length is provided between the convergence and the divergence portion.

Within this meaning, a preferred embodiment is also advantageous in which the convergence portion transitions in an edgeless manner and/or gradually into the divergence portion at the constriction. There is therefore no sudden change in the angle of inclination of the wall at the transition from the convergence portion to the divergence portion. The formation for example of a disadvantageous edge, which may have an undesired influence on the gas flow, is prevented.

Overall, a preferred design of the nozzle is one in which the wall has a continuous, edge-less course over the entire passage.

In the case of a particularly preferred embodiment, the convergence portion comprises a wall that is curved towards the passage longitudinal axis, at least in portions, which wall preferably has a radius of curvature of between 4 and 8 mm. Alternatively or in addition, the divergence portion comprises a wall that is curved towards the passage longitudinal axis, at least in portions, which wall preferably has a radius of curvature of between 20 and 30 mm.

In order to ensure a defined inlet flow, a preferred variant of the nozzle additionally comprises an inflow portion that is arranged upstream of the convergence portion, on the inlet side. The inflow portion is preferably cylindrical.

In order to ensure cutting characteristics that are independent of the cutting direction, the inflow portion and/or the divergence portion and/or convergence portion preferably have a circular cross section.

A nozzle that is as compact in structure as possible results from the passage being formed exclusively by a cylindrical inflow portion, the convergence portion and the divergence portion. In connection with this aspect, an embodiment is also preferred in which the nozzle is a single-hole nozzle.

In order to form a homogeneous gas flow even at distances of several millimeters from the nozzle mouth, various structural measures have been found to be particularly advantageous. For example, the cross-sectional area of the mouth should be smaller than the cross-sectional area of the inlet. Said cross-sectional area of the mouth is preferably more than 15% and/or less than 75% of the cross-sectional area of the inlet. The cross-sectional area of the constriction is preferably more than 180% and/or less than 250%, preferably less than 220%, of the cross-sectional area of the constriction.

In particular for three-dimensional laser cutting machining of components, preferably metal profile components, a design of the nozzle having the following diameter dimensions is advantageous. Preferably, the diameter of the mouth is between 1.8 and 3.5 mm, the diameter of the constriction is between 1.3 and 3.0 mm, and/or the diameter of the inlet is between 4.0 and 5.0 mm.

In the case of a preferred embodiment, the length of the convergence portion is between 3.5 and 4.5 mm, the length of the divergence portion is between 5.0 and 7.0 mm, and/or the length of the inflow portion is between 1.0 and 1.5 mm.

The outer contour of the laser cutting nozzle plays a particular role in particular in two respects. Firstly, for use in three-dimensional workpiece machining the laser cutting nozzle should be as small as possible in order that collision-free machining can be ensured even in very restricted space conditions. Furthermore, the laser cutting nozzle is preferably used in conjunction with capacitive nozzle-workpiece distance control. The outer contour, in particular the surface of the nozzle that is close to the workpiece, can have a decisive influence on the significance of the capacitance measurement signal for the distance control. Embodiments explained in the following are therefore characterized by particular advantages with respect to use of the nozzle in conjunction with capacitive distance control.

The outside diameter of the nozzle on the mouth side is preferably between 3.0 and 4.6 mm. Furthermore, the length of a conical peripheral surface on the mouth side is between 4.0 and 5.0 mm and/or the angle of inclination of said surface relative to the passage longitudinal axis is between 20 and 30°.

A particularly preferred embodiment that is advantageous in terms of structure is one in which the outer periphery of the nozzle is greatest, in the longitudinal direction, approximately at the height of the constriction.

Advantages in terms of handling result from the conical peripheral surface of the nozzle on the mouth side transitioning into a cylindrical peripheral surface in the region of the nozzle having the largest outside diameter, which cylindrical peripheral surface is preferably provided with a knurling.

In order to fasten the nozzle to a machining head of a laser machining unit, an external thread is formed on the peripheral surface of the nozzle, at the inlet side. Alternatively, the fastening means may be designed in any other manner desired, e.g. by means of annular clamping elements.

It is advantageous, in terms of manufacture and for use in conjunction with capacitive distance control, for the nozzle to comprise an integral main body consisting of metal, preferably copper, the main body forming at least the divergence portion of the passage. In particular, the nozzle is produced integrally from metal, preferably copper.

A nozzle structure comprising an end face that extends perpendicularly to the passage longitudinal axis and surrounds the mouth is also advantageous for use in conjunction with capacitive distance control. A design of the end face, which annularly surrounds the mouth, having a width of from 0.3 to 0.7 mm has proven expedient in practice. This design achieves a sufficiently high response characteristic that also allows for distance control for large working distances (distance between the end face and the workpiece) in the range of over 2 mm, in particular in the range of up to 6 mm. Machining at a greater working distance increases the process reliability, which also makes it possible to carry out error-free machining at high speeds, at a feed rate in the range of over 10 m/min, in particular even in the range of from 30 to 50 m/min.

A laser machining unit comprising a laser cutting nozzle described above and in the following is also considered to be part of the invention. The advantages of the nozzle design according to the invention result in particular if the nozzle is used in conjunction with capacitive distance control of the nozzle-workpiece distance, which control determines the capacitance between the nozzle and the workpiece for the purpose of the control. The unit preferably comprises a machining head that is equipped with the laser cutting nozzle and is intended for three-dimensional laser cutting machining.

The unit preferably comprises a $CO_2$ or solid-state laser, in particular a disc laser, having a maximum power of at least 2 kW, as the laser source. Alternatively, fiber lasers and laser diodes can also be used.

In order to ensure that the laser beam does not strike the inner wall of the nozzle owing to too large a divergence angle, in a preferred embodiment the laser source of the unit can generate a laser beam having a beam parameter product of ≤8 mm mrad, preferably ≤4 mm mrad, more preferably ≤2 mm mrad.

Furthermore, a method for operating a laser machining unit using the laser cutting nozzle described above and in the following is considered part of the invention. In particular, three-dimensional laser cutting machining is carried out using the nozzle, in which machining a cutting gas is fed to the laser cutting nozzle at a pressure of between 8 and 23 bar, and a metal profile having a workpiece thickness of from 1 to 4 mm is cut, at least intermittently, at a distance between the nozzle and the workpiece surface that is in a distance range of between 3 and 6 mm.

In general, cutting is carried out at an angle of incidence of the beam on the workpiece surface of 90°. However, small contours can be cut for example only using the pivot axes provided for oblique positioning of the cutting head, without using the translational axes; in this case, the contours can be cut at an oblique position of up to 30°.

Preferably nitrogen and/or compressed air is used as the cutting gas.

The dependent claims and the embodiments of the invention described in the following relate to further configurations of the invention. The invention will be described in greater detail in the following, on the basis of embodiments and with reference to the accompanying drawings. In the drawings, in detail:

DETAILED DESCRIPTION

Figure 1:
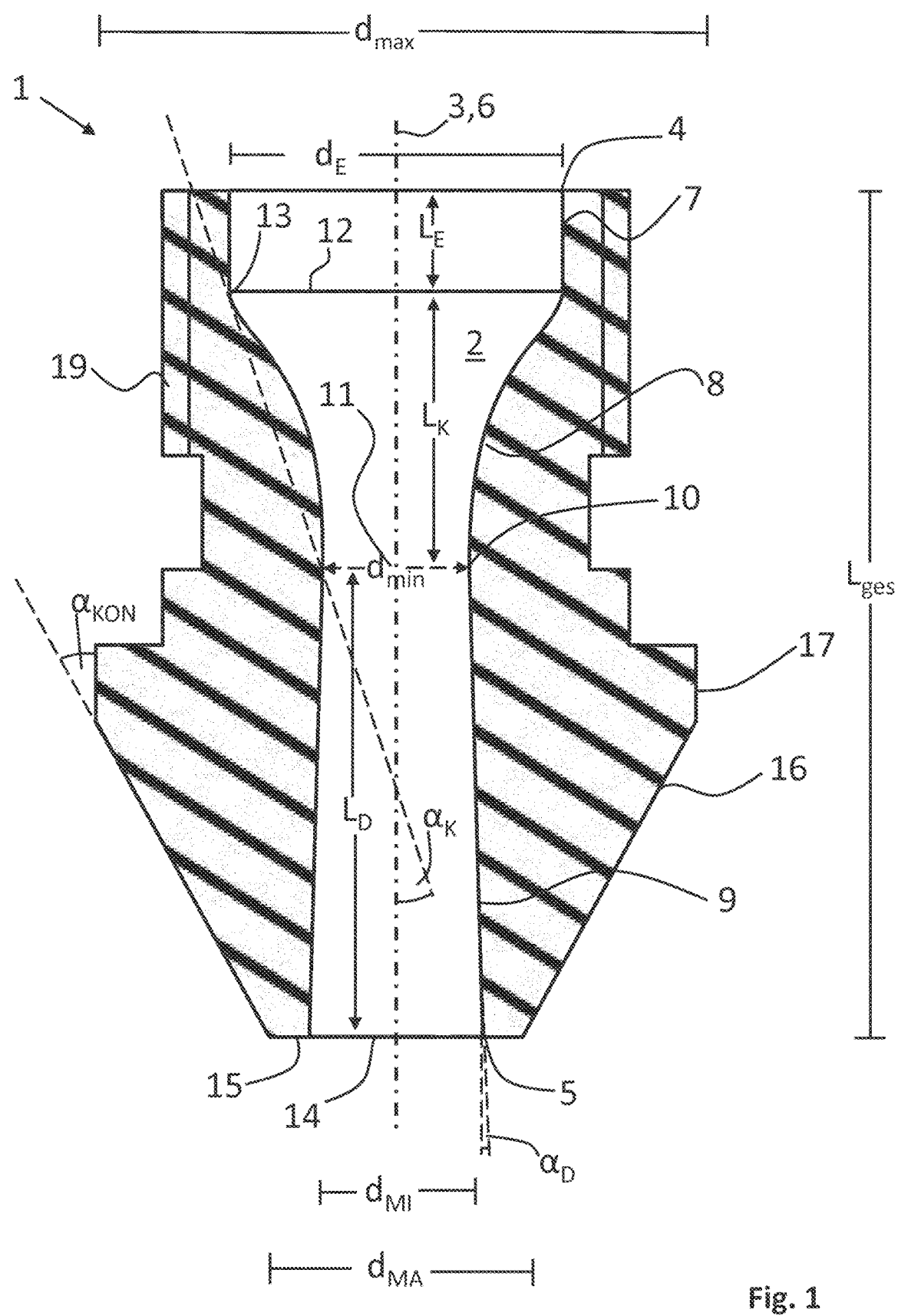
FIG. 1 is a central cross-sectional view of a laser cutting nozzle.

FIG. 1 is a cross-sectional view of a laser cutting nozzle 1 for a laser machining unit. The nozzle 1 is a single-hole nozzle which is produced integrally from copper. FIG. 1 is a central longitudinal section along the nozzle longitudinal axis 3. The nozzle 1 is substantially formed as a body that is rotationally symmetric with respect to the longitudinal axis 2.

The nozzle 1 comprises a central passage 2 for a laser beam and cutting gas, which passage extends from a nozzle inlet 4 as far as a nozzle mouth 5, along a passage longitudinal axis 6. The passage longitudinal axis 6 coincides with the nozzle longitudinal axis 3.

The passage 2 consists of a cylindrical inflow portion 7, a continuously converging convergence portion 8, and a divergence portion 9. The passage 2 has a circular cross section over the entire length $L_{ges}$ thereof, i.e. over all the portions 7, 8, 9. The convergence portion 8 transitions continuously, in an edgeless manner and gradually, into the divergence portion 9 at a constriction 10.

In order to form an emergent gas flow that has ratios that are homogenous and are favorable for laser melting cutting over a large distance range of up to 6 mm, in the embodiment shown the passage 2 is formed in the following manner.

At the inflow portion 7, the passage 2 has a diameter $d_E$ of 4.4 mm. At the constriction, the diameter $d_{min}$ is 1.6 mm. The mouth $d_{MI}$ has a diameter of 1.94 mm. Consequently, the cross-sectional area 11 at the constriction 10 is less than 40% of the cross-sectional area 12 at the inlet 13 of the convergence portion 8 (corresponds to the cross-sectional area over the entire inflow portions since said portion is cylindrical). In particular, the constriction cross section 12 is only 13% of the cross-sectional area 12 at the inlet 13 of the convergence portion 8. By the mouth 5, the passage 2 has widened continuously again to over 130%, in particular to 147%, of the cross-sectional area 11 at the constriction. The cross-sectional area 14 of the mouth 5 is only 19% of the cross-sectional area 12 at the inlet 14 of the passage 2.

In order to prevent the flow from "breaking off" in the edge region, the wall of the passage 2 is at an angle of inclination relative to the passage longitudinal axis 6 of at most 5°, over the entire divergence portion 9. The average angle of inclination $\alpha_D$ of the wall of the passage relative to the passage longitudinal axis 6 in the divergence portion 9 is 1.5°. In contrast, the average angle of inclination $\alpha_D$ of the wall of the passage relative to the passage longitudinal axis 6 in the convergence portion 8 is significantly greater, at 12°.

The length $L_E$ of the inflow portion 7 is 1.3 mm, the length $L_K$ of the convergence portion 8 is 4.0 mm, and the length $L_D$ of the divergence portion 9 is 6.5 mm. The overall length $L_{ges}$ of the passage 2 is consequently 11.8 mm. The length $L_D$ of the divergence portion 9 is approximately 1.63 times the length $L_K$ of the convergence portion 8.

It is also significant that the length $L_D$ of the divergence portion 9 is less than 5 times the diameter $d_{min}$ of the constriction 10. In particular, the length $L_D$ is 4.1 times the constriction diameter $d_{min}$.

The convergence portion 8 and the divergence portion 9 are not strictly conical. The wall is curved towards the passage longitudinal axis 6 at least in portions (convergence portion 8: radius of curvature of e.g. 6 mm; divergence portion 9: radius of curvature of e.g. 26 mm).

The outside diameter $d_{MA}$ of the nozzle 1 on the mouth side is 3.15 mm. The width of the end face 15 extending perpendicularly to the passage longitudinal axis 6, which face annularly surrounds the mouth 5, is 0.605 mm. This makes it possible to achieve a sufficiently high response characteristic for capacitive distance control that also allows for distance control in the range of up to 6 mm. Machining at a greater working distance increases the process reliability, with the result that error-free machining can be carried out at high speeds, at a feed rate in the range of 10-50 m/min.

Figure 2:
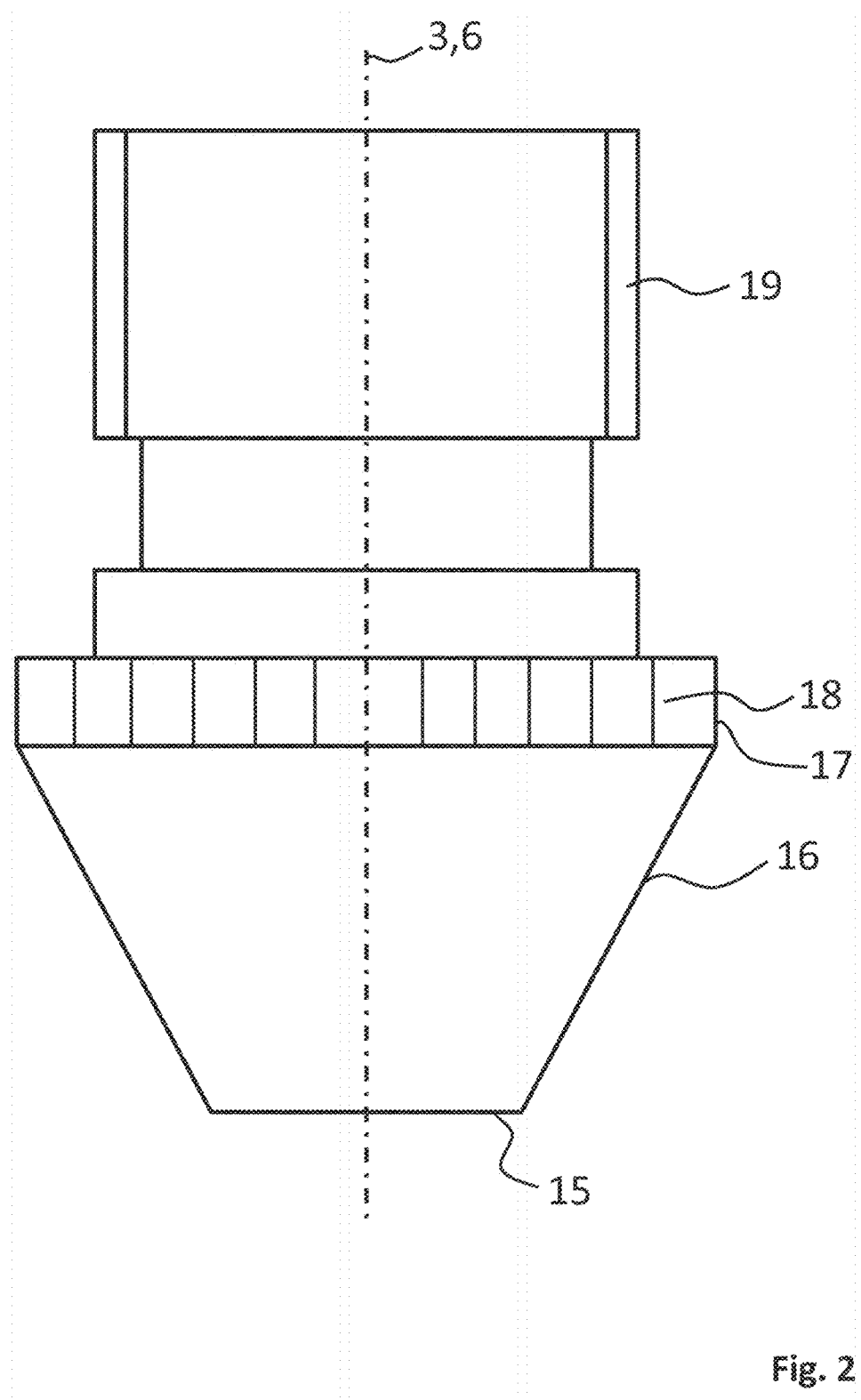
FIG. 2 is a side view of the laser cutting nozzle according to FIG. 1.

Further details of the outer contour of the nozzle 1 will be explained with reference to FIG. 2, which is a side view of the laser cutting nozzle 1.

A conical peripheral surface 16 having a length $L_{KON}$ of 4.5 mm and an angle of inclination $\alpha_{KON}$ relative to the passage longitudinal axis 6 of 28° adjoins the end face 15 on the mouth side. Approximately at the height of the constriction 10, the conical peripheral surface 16 transitions into a cylindrical peripheral surface 17, the largest outside diameter $d_{max}$ of which is 8.0 mm. The cylindrical peripheral surface 17 is provided with a knurling 18 which functions as a gripping element during handling, e.g. when screwing the nozzle 1 into a nozzle receptacle of a machining head. An external thread 19 is formed on the peripheral surface of the nozzle 1, by means of which thread the nozzle can be screwed into a nozzle receptacle of a machining head of a laser machining unit for example.

The laser cutting nozzle 1 according to FIG. 1 is a preferred embodiment of a laser cutting nozzle 1 for three-dimensional laser cutting machining of metal profiles. The shaping of the passage 2 brings about distance-independent, constant fluid dynamic radios at the workpiece surface and in the cutting gap. The shaping of the outer contour is characterized by favorable characteristics for capacitive distance control of the nozzle-workpiece distance.

The parameters of further preferred embodiments of a laser cutting nozzle are set out in Table 1, together with the corresponding parameters of the nozzle 1 according to FIG. 1, all the example nozzles coinciding at least with respect to the overall length $L_{ges}$, the inside ($d_E$) and outside diameter on the inlet side, the lengths $L_E$, $L_K$, $L_D$ of the inflow, convergence and divergence portion 7, 8, 9, the maximum outside diameter $d_{max}$, and the length $L_{KON}$ of the conical peripheral surface 16.

TABLE 1

Parameters of a plurality of embodiments of laser cutting nozzles.
Example No. 1 corresponds to the nozzle according to FIG. 1.

| No. | $d_{MI}$ [mm] | $d_{MA}$ [mm] | $d_{min}$ [mm] | $\alpha_D$ [°] | $\alpha_{KON}$ [°] | $\alpha_K$ [°] | $L_D/d_{min}$ | $d_{MI}^2/d_{min}^2$ | $d_{MI}^2/d_E^2$ | $d_{min}^2/d_E^2$ |
|---|---|---|---|---|---|---|---|---|---|---|
| 1 | 1.94  | 3.15 | 1.6 | 1.5 | 28 | 12 | 4.1 | 19% | 147% | 13% |
| 2 | 2.352 | 3.15 | 1.8 | 2.4 | 28 | 11 | 3.6 | 29% | 171% | 17% |
| 3 | 2.855 | 4.15 | 2   | 3.8 | 23 | 10 | 3.3 | 42% | 204% | 21% |
| 4 | 3.398 | 4.15 | 2.6 | 3.5 | 23 | 8  | 2.5 | 60% | 171% | 35% |
| 5 | 3.7   | 4.5  | 2.6 | 4.8 | 21 | 8  | 2.5 | 71% | 203% | 35% |

Figure 3:
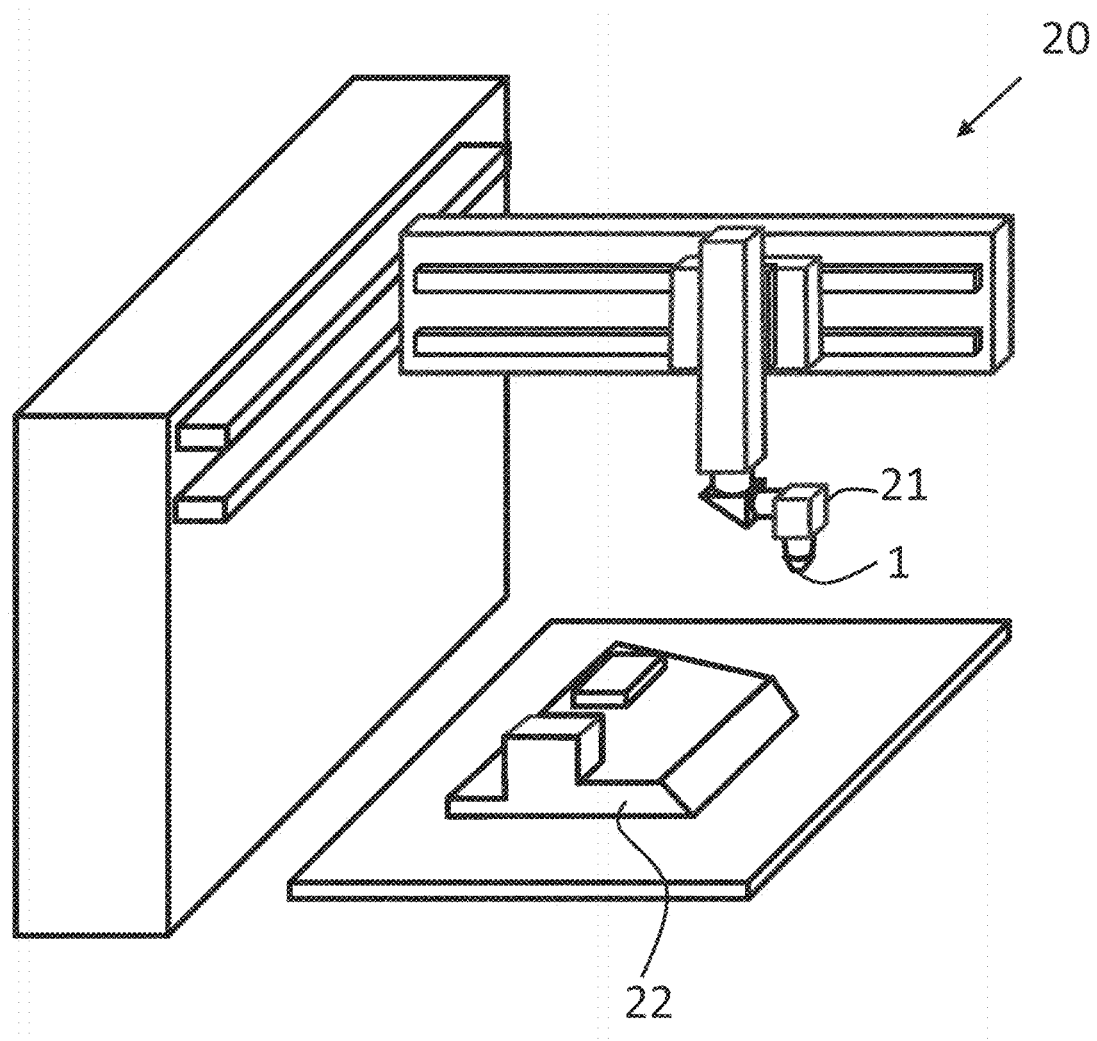
FIG. 3 shows a laser machining unit that comprises a laser cutting nozzle according to FIG. 1 for three-dimensional workpiece machining.

FIG. 3 shows a laser machining unit 20 comprising a laser cutting nozzle 1 according to one of the above examples. The laser machining unit 20 comprises a machining head 21 that is equipped with a laser cutting nozzle 1 and is intended for three-dimensional laser cutting machining. A laser diode, $CO_2$ or solid-state laser (not shown in greater detail), in particular a disc laser, having a maximum power of at least 2 kW, is used as the laser source.

The unit 21 has capacitive distance control of the nozzle-workpiece distance.

The unit 21 for example carries out three-dimensional laser cutting machining using the nozzle 1, during which machining a cutting gas (e.g. nitrogen or argon) is fed at a pressure of between 8 and 23 bar. A metal profile 22 having a workpiece thickness of from 1 to 4 mm is cut, at least intermittently, at a distance between the nozzle 1 and the workpiece surface that is in a distance range of between 3 and 6 mm.

For example, construction steel and stainless steel having a sheet thickness of 1 mm is cut at 50 m/min using a laser source at a power of 5 kW.

What is claimed is:

1. A laser cutting nozzle for a laser machining unit, the laser cutting nozzle comprising:
   a passage for a laser beam and a cutting gas,
   the passage extending between a nozzle inlet and a nozzle mouth along a passage longitudinal axis,
   the passage converging continuously towards the nozzle mouth thereof, in a convergence portion, as far as a constriction of the passage, to less than 40% of a cross-sectional area at an inlet of the convergence portion,
   the passage diverging continuously in a divergence portion, proceeding from the constriction of the passage, as far as the mouth of the passage, to over 130% of a cross-sectional area at the constriction of the passage;
   wherein the convergence portion transitions in an edgeless manner into the divergence portion at the constriction;
   wherein, in the entire divergence portion, the wall of the passage is at an angle of inclination relative to the passage longitudinal axis of at most 5°;
   wherein the length of the divergence portion is less than 5 times the diameter of the constriction; and
   wherein the divergence portion has a length that is more than 1.4 times the length of the convergence portion.

2. The laser cutting nozzle of claim 1, wherein the average angle of inclination of the wall of the passage relative to the passage longitudinal axis in the convergence portion is greater than 7° and less than 13°.

3. The laser cutting nozzle of claim 1, wherein the average angle of inclination of the wall of the passage relative to the passage longitudinal axis in the divergence portion is less than 4.0° and greater than 1.0°.

4. The laser cutting nozzle of claim 1, wherein the convergence portion transitions directly into the divergence portion at the constriction.

5. The laser cutting nozzle of claim 1, wherein the passage additionally comprises a cylindrical inflow portion that is arranged upstream of the divergence portion, on the inlet side.

6. The laser cutting nozzle of claim 1, wherein the divergence portion is longer than the convergence portion, wherein the divergence portion has a length that is less than 1.7 times the length of the convergence portion.

7. The laser cutting nozzle of claim 1, wherein the length of the divergence portion is less than 3 times the diameter of the constriction and is more than twice the diameter of the constriction.

8. The laser cutting nozzle of claim 1, wherein the cross-sectional area of the mouth is more than 180% and less than 220% of the cross-sectional area of the constriction.

9. The laser cutting nozzle of claim 1, wherein the convergence portion comprises a wall that is curved towards the passage longitudinal axis, at least in portions, which wall has a radius of curvature of between 4 and 8 mm.

10. The laser cutting nozzle of claim 1, wherein the divergence portion comprises a wall that is curved towards the passage longitudinal axis, at least in portions, which wall has a radius of curvature of between 20 and 30 mm.

11. The laser cutting nozzle of claim 1, wherein the diameter of the mouth is between 1.8 and 3.5 mm, the diameter of the constriction is between 1.3 and 3.0 mm, the length of the convergence portion is between 3.5 and 4.5 mm, the length of the divergence portion is between 5.0 and 7.0 mm, and the outside diameter of the nozzle on the mouth side is between 3.0 and 5 mm.

12. The laser cutting nozzle of claim 1, wherein the nozzle comprises a conical peripheral surface on the mouth side that has a length of between 4.0 and 5.0 mm and is at an angle of inclination relative to the passage longitudinal axis of between 20° and 30°.

13. The laser cutting nozzle of claim 1, wherein the nozzle comprises an end face that extends perpendicularly to the passage longitudinal axis, annularly surrounds the mouth, and has a width between 0.3 and 0.7 mm.

14. A laser machining unit comprising:
a machining head; and
the laser cutting nozzle of claim 1 secured to the machining head.

15. The laser machining unit of claim 14, further comprising a capacitive distance control of the nozzle-workpiece distance that determines the capacitance between the nozzle and the workpiece for the purpose of the control.

16. The laser machining unit of claim 14, wherein the laser cutting nozzle is configured to perform three-dimensional laser cutting machining.

17. The laser machining unit of claim 14, further comprising a laser source, the laser source comprising at least one of a laser diode, a $CO_2$ laser, a solid-state laser, and a disc laser, the laser source having a maximum power of at least 2 kW.

18. The laser machining unit of claim 14, wherein a laser source of the unit can generate the laser beam having a beam parameter product of less than or equal to 2 mm mrad.

19. A method of performing three-dimensional cutting machining on a metal profile, the method comprising:
feeding a cutting gas to a laser cutting nozzle, the laser cutting nozzle comprising a passage for a laser beam and a cutting gas, the passage extending between a nozzle inlet and a nozzle mouth along a passage longitudinal axis, the passage converging continuously towards the nozzle mouth thereof, in a convergence portion, as far as a constriction of the passage, to less than 40% of a cross-sectional area at an inlet of the convergence portion, the passage diverging continuously in a divergence portion, proceeding from the constriction of the passage, as far as the mouth of the passage, to over 130% of a cross-sectional area at the constriction of the passage, wherein, in the entire divergence portion, the wall of the passage is at an angle of inclination relative to the passage longitudinal axis of at most 5°, and the length of the divergence portion is less than 5 times the diameter of the constriction and more than twice the diameter of the constriction, wherein the cutting gas is fed on the inlet side, at a pressure of between 8 and 23 bar; and
cutting, at least intermittently, the metal profile at a distance between the nozzle and a workpiece surface that is in a distance range of between 2 and 6 mm;
wherein the metal profile has a workpiece thickness of between 1 to 4 mm.

20. A laser cutting nozzle for a laser machining unit, the laser cutting nozzle comprising:
a passage for a laser beam and a cutting gas,
the passage extending between a nozzle inlet and a nozzle mouth along a passage longitudinal axis,
the passage converging continuously towards the nozzle mouth thereof, in a convergence portion, as far as a constriction of the passage, to less than 40% of a cross-sectional area at an inlet of the convergence portion,
the passage diverging continuously in a divergence portion, proceeding from the constriction of the passage, as far as the mouth of the passage, to over 130% of a cross-sectional area at the constriction of the passage;
wherein the convergence portion transitions in an edgeless manner into the divergence portion at the constriction;
wherein, in the entire divergence portion, the wall of the passage is at an angle of inclination relative to the passage longitudinal axis of at most 5°;
wherein the length of the divergence portion is less than 5 times the diameter of the constriction and more than twice the diameter of the constriction.

21. A laser cutting nozzle for a laser machining unit, the laser cutting nozzle comprising:
a passage for a laser beam and a cutting gas,
the passage extending between a nozzle inlet and a nozzle mouth along a passage longitudinal axis,
the passage converging continuously towards the nozzle mouth thereof, in a convergence portion, as far as a constriction of the passage, to less than 40% of a cross-sectional area at an inlet of the convergence portion,
the passage diverging continuously in a divergence portion, proceeding from the constriction of the passage, as far as the mouth of the passage, to over 130% and less than 250% of a cross-sectional area at the constriction of the passage;
wherein the diameter of the mouth is between 1.8 and 3.5 mm;
wherein the diameter of the constriction is between 1.3 and 3.0 mm;
wherein, in the entire divergence portion, the wall of the passage is at an angle of inclination relative to the passage longitudinal axis of at most 5°; and
wherein the length of the divergence portion is less than 5 times the diameter of the constriction and more than twice the diameter of the constriction.

* * * * *